United States Patent
Mansjur et al.

(10) Patent No.: US 11,556,591 B2
(45) Date of Patent: Jan. 17, 2023

(54) TENANT-ISOLATED CUSTOM ANNOTATIONS FOR SEARCH WITHIN A PUBLIC CORPUS

(71) Applicant: International Business Machines Corporation, Armonk, NY (US)

(72) Inventors: Dwi Sianto Mansjur, Cary, NC (US); Scott Carrier, New Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/931,633

(22) Filed: Jul. 17, 2020

(65) Prior Publication Data
US 2022/0019623 A1 Jan. 20, 2022

(51) Int. Cl.
*G06F 16/903* (2019.01)
*G06F 16/93* (2019.01)
*G06F 16/245* (2019.01)
*G06F 16/9032* (2019.01)
*G06F 16/2457* (2019.01)

(52) U.S. Cl.
CPC .. *G06F 16/90332* (2019.01); *G06F 16/90339* (2019.01); *G06F 16/90344* (2019.01); *G06F 16/93* (2019.01); *G06F 16/24573* (2019.01)

(58) Field of Classification Search
None
See application file for complete search history.

(56) References Cited

U.S. PATENT DOCUMENTS

| | | | |
|---|---|---|---|
| 7,013,313 B1* | 3/2006 | LaRue | G06F 16/27 |
| 8,005,835 B2 | 8/2011 | Walther et al. | |
| 9,659,055 B2 | 5/2017 | Koll et al. | |
| 9,721,004 B2 | 8/2017 | Byron et al. | |
| 10,430,445 B2 | 10/2019 | Crouch et al. | |
| 2002/0107735 A1* | 8/2002 | Henkin | G06F 16/957 |
| | | | 705/14.66 |
| 2009/0055388 A1* | 2/2009 | Song | G06F 16/951 |
| | | | 707/999.005 |
| 2009/0100067 A1* | 4/2009 | Dunne | G06F 16/24573 |
| | | | 709/204 |
| 2009/0177486 A1* | 7/2009 | Irish | G06F 16/903 |
| 2015/0193481 A1* | 7/2015 | McGrath | G06F 16/178 |
| | | | 707/638 |

* cited by examiner

*Primary Examiner* — Son T Hoang
(74) *Attorney, Agent, or Firm* — Cantor Colburn LLP; Kelsey M. Skodje

(57) ABSTRACT

Annotations are customized for a tenant-specific search within a public corpus. In a non-limiting embodiment of the invention, a cartridge file is received by a semantic search application. The cartridge file includes a new attribute definition that is not available in an index of the semantic search application. The new attribute definition is incorporated within the index based on an approximation of one or more existing attributes in the index. One or more documents are retrieved from the public corpus based on a concept search using the incorporated new attribute definition and the one or more documents are annotated based on the incorporated new attribute definition. The annotated one or more documents are stored in a tenant-specific dataset separate from the public corpus.

18 Claims, 7 Drawing Sheets

TENANT-ISOLATED CUSTOM ANNOTATIONS FOR SEARCH WITHIN A PUBLIC CORPUS

BACKGROUND

The present invention generally relates to natural language processing (NLP), and more specifically, to creating tenant-isolated custom annotations for a search within a public corpus.

Machine learning is a form of artificial intelligence that uses algorithms to enable a system to learn from data rather than through explicit programing. Machine learning follows a process of preparing data, training an algorithm to generate a machine learning model, and then making and refining predictions. Machine learning algorithms learn from a labelled set of features from training data. The field of machine learning has been gaining momentum due to the capabilities of state-of-the-art processors and to the abundant amount of digitized data that is available, which are both key to achieving accurate predictions.

NLP is a process that can leverage machine learning to process and analyze large amounts of natural language data. This natural language data is sometimes referred to as a corpus. In linguistics, a corpus or text corpus is a language resource consisting of a large set of structured and unstructured text. NLP processing can occur on a large corpora resulting in many annotations associated with the corpora. With the massive amounts of data that are available and being added to computer repositories each day, companies are trying to figure out how they can structure the data, clean it, and garner deeper insights from the data. NLP is the parsing and semantic interpretation of text, allowing computers to learn, analyze, and understand human language to enable, for example, communication between computers and humans in natural language.

Healthcare documents, such as medical records, are an example of a type of digitized data that is stored in computer systems. NLP techniques can be used to extract features describing a patient from a medical record(s) associated with the patient such as a medical condition of the patient, a height of the patient, and/or a test performed or scheduled to be performed on the patient. Medical records can be stored in many different formats including text data and/or image data. In addition, medical records often include structural information such as titles, sections, and headers; as well as a variety of text patterns such as structured data (e.g., paragraphs, sentences, etc.) and unstructured data (e.g., a list of symptoms, conditions listed in bullet points, etc.).

SUMMARY

Embodiments of the invention are directed to a computer-implemented method for customizing annotations for a tenant-specific search within a public corpus. A non-limiting example of the method includes receiving a cartridge file by a semantic search application. The cartridge file includes a new attribute definition that is not available in an index of the semantic search application. The new attribute definition is incorporated within the index based on an approximation of one or more existing attributes in the index. One or more documents are retrieved from the public corpus based on a concept search using the incorporated new attribute definition and the one or more documents are annotated based on the incorporated new attribute definition. The annotated one or more documents are stored in a tenant-specific dataset separate from the public corpus.

In some embodiments of the invention, a search query can be received by the semantic search application. In some embodiments of the invention, a search result of the tenant-specific dataset is completed based on the search query and the annotated one or more documents. The semantic search experience is improved by providing a specialized, tenant-specific annotated corpus isolated from the public corpus. Advantageously, new attributes can be introduced after the runtime operation and leveraged to provide tenant-specific annotations and search results. Thus, advantageously, searching (e.g., logical searching with AND, NOT and OR) can be improved with tenant-specific results, enabling a better semantic search experience. In some embodiments of the invention, the semantic search application can distinguish between publicly available annotations and tenant-specific annotations. Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
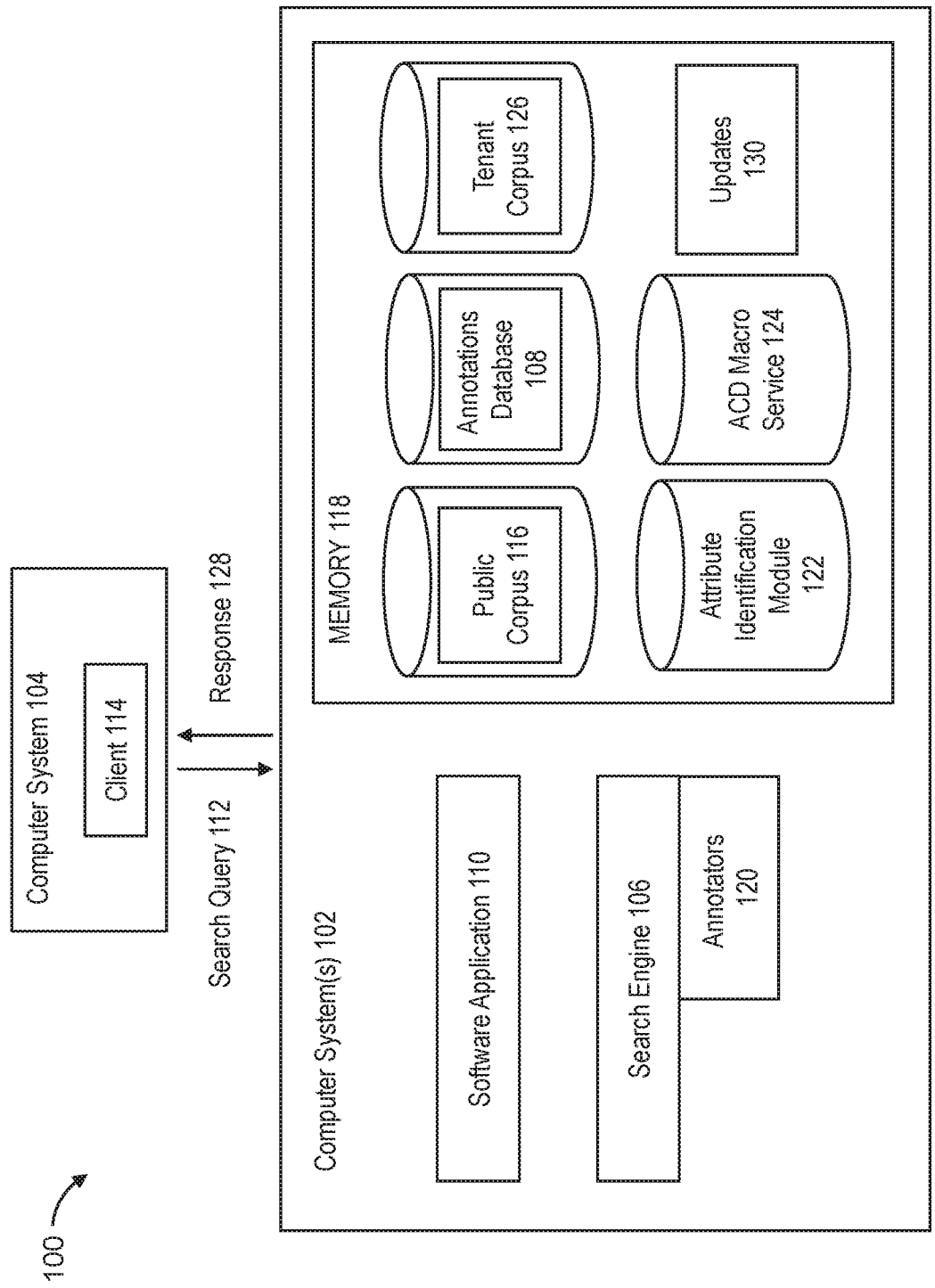
FIG. 1 depicts a block diagram of a system for generating tenant-isolated custom annotations for a search within a public corpus according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention are directed to the generation of tenant-isolated custom annotations for a search within a public corpus. A text corpus can include any structured or unstructured text, such as, for example, a healthcare document. Healthcare documents can include, but are not limited to medical records, lab reports, pathology reports, and pre-authorization forms. Healthcare documents can be used by medical practitioners to understand the medical history, or previous health status, of the patient, as well as to keep the medical practitioner up to date about the patient's current status in order to aid the medical practitioner in providing the patient with optimal healthcare.

A corpus annotator is a type of NLP service that can supplement a text corpus with workable data (annotations). Annotators can be generic or domain specific, such as the Annotator for Clinical Data, optimized for clinical data. Annotators can be configured using configuration editor tools to provide an almost limitless variety of annotation outputs (e.g., feature extractions). For example, one type of annotator is a tokenizer configured to split text or sentences into words or word-level units. Another example annotator is a parser configured to perform syntactic analysis of a sentence to build a syntactic tree or graph. Yet another example annotator is a part-of-speech tagger configured to determine a part of speech of each word in the context of a sentence. It is understood that annotators are not limited to the examples provided.

Corpus annotators can be used to improve the search capabilities within a corpus by supplementing the native information with searchable annotations. These annotations can be associated with predefined concepts and attributes. As a corpus can contain hundreds, thousands, or even millions of documents, enriching a text corpus with annotations is often an expensive computational process that is nevertheless necessary to enable a search engine to provide an effective search. In particular, while indexing a public corpus with a search engine is a routine process (e.g., Insight Medical Literature (IML) comes with pre-indexed articles), customizing a search engine with new concepts and attributes is a time-consuming process. Introducing a new concept is even more expensive when the search engine is already put in the operation runtime stage.

Turning now to an overview of aspects of the present invention, one or more embodiments of the invention address the above-described shortcomings of the prior art by providing a platform for generating tenant-isolated custom annotations for a search within a public corpus. Tenant-isolated custom annotations are built using an incremental and iterative procedure that annotates a subset of documents in a public corpus using attribute definitions personalized to a specific entity (tenant, user, etc.). Advantageously, tenant-isolated custom annotations can be used to customize a search engine application that is already in the operation runtime stage. Leveraging custom annotations at the tenant level (i.e., non-globally) in this manner can result in more accurate, tenant-tailored feature extractions from the documents in the public corpus. For example, logical searching with AND, NOT, and OR can be improved by using tenant-specific annotations. In some embodiments of the invention, a domain expert can specify new attribute or concept configurations post-runtime that are specifically tailored to a query.

In accordance with one or more embodiments of the present invention, NLP techniques are used to extract features (e.g., facts) from one or more documents in a public corpus. As used herein, the terms "record" and "document" are used interchangeably to refer to a grouping of digitized data that is stored by a computer and processed as a single unit. A portion includes a least a subset of the record or document. As used herein, the term "character string data" refers to a group of one or more text characters (e.g., natural language data) which may be grouped into sentences or paragraphs.

As used herein, the terms "NLP engine" and "NLP service" refer to software and/or hardware components that process and analyze natural language data (written and/or spoken). For written data, the natural language data that is input to the NLP engine can be grouped into documents which may include, for example, one or more sentences, one or more paragraphs, one or more forms, one or more charts, one or more bulleted lists, one or more lists (comma-separated or otherwise), and/or one or more pages. One or more embodiments of the present invention described herein include an NLP engine which has been trained using training data to fold new attributes (provided, e.g., at runtime) into existing attributes and concepts using machine learning techniques such as collaborative filtering and topic modeling. The terms "trained NLP engine" or "NLP engine that has been trained" are used interchangeably herein refer to an NLP engine that has been programmed using a machine learning technique to fold new attributes into existing attributes and concepts.

As used herein, the terms "performance," "accuracy," or "accuracy threshold" of an NLP refers to a likelihood (or probability) that a feature output from the NLP engine is correct. This can be assessed in a variety of manners such as, but not limited to, precision, recall and $F_1$ score (also known as the Sorensen-Dice coefficient or Dice similarity coefficient).

Examples described herein relate to healthcare documents which are just one type of document that may be input to one or more embodiments of the present invention. One skilled in the art will recognize that one or more embodiments of the present invention described herein can be applied to any type of documents that may contain form or other non-character string type data.

Turning now to a more detailed description of aspects of the present invention, FIG. 1 depicts a block diagram 100 of a system for generating tenant-isolated custom annotations for a search within a public corpus in accordance with one or more embodiments of the present invention. In some embodiments of the invention, one or more computers system(s) 102 are coupled to a computer system 104. While shown in a particular configuration for ease of illustration, it is understood that any elements of the block diagram 100 (e.g., search engine 106, annotations database 108, etc.) may be used and/or integrated within either or both of the computers systems 102 and 104.

In some embodiments of the invention, one or more software application(s) 110 (also referred to herein as a semantic search application) on computer system 102 are configured to receive a search query 112. Software application 110 can be implemented as software executed on one or more processors (e.g., CPU(s) 702a, 702b, 702c of FIG. 7). In some embodiments of the invention, the search query 112 is received from a client 114 of the computer system 104. The search query 112 can be made using software application 110 and/or received from computer system 104. The search query 112 can include or be associated with a public corpus 116 that can be fully or partially loaded into a memory 118 of the computer system 102. The public corpus 116 can contain hundreds, thousands, and/or millions of documents, also referred to as "big data". In some embodiments of the invention, the public corpus 116 includes one or more healthcare documents. In some embodiments of the invention, the healthcare documents include unstructured text.

In some embodiments of the invention, software application 110 is configured to route the search query 112 to the search engine 106. In some embodiments of the invention, the search engine 106 includes one or more annotators 120 for completing the search query 112. In some embodiments of the invention, the annotators 120 are retrieved from the annotations database 108. In some embodiments of the invention, the retrieved annotator 120 is stored in memory 118.

In some embodiments of the invention, the computer system 102 includes an attribute identification module 122 configured to identify attributes and concepts specified in the search query 112 in the unstructured text. The attribute identification module 122 can be implemented as hardware, software, or a combination of hardware and software. In some embodiments of the invention, the attribute identification module 122 is stored in memory 118.

In some embodiments of the invention, the attribute identification module 122 identifies new and existing attributes and/or concepts in the query 112. As used herein, an "existing attribute or concept" refers to attribute and concept definitions that are preconfigured in the search engine 106 prior to runtime operation. As used herein, a "new attribute or concept" refers to attribute and concept definitions that are specified for the first time at runtime, i.e., definitions that are not native to the search engine 106. An attribute can be composed of both new and existing concepts. A new attribute can be composed of new and existing concepts. There are several use cases for employing attributes in this manner. One use case is to aggregate a set of specific concepts into a more general concept. For example, given an annotator(s) that output a set of unique fine-grained concepts for "Bronchogenic Carcinoma", "Non-Small Cell Lung Carcinoma", "Squamous cell carcinoma of lung", one may desire to aggregate all these specific permutations of lung cancer into a more general concept called "Lung Cancer". An attribute could be employed in this case to produce a "Lung Cancer" concept anytime one of the aforementioned concepts (and possibly hundreds of other permutations) are detected. Another use case for attributes is combining other concepts and tokens to produce a new attribute annotation. In other words, beyond simply rolling up more fine-grained concepts into a more general one, attributes may contain a set of values in which each value is predicated up the existence of one or more fine-grained concepts. For example, one could have a TumorGrade attribute with "low", "high", "intermediate", and "undetermined" values, each of which may be triggered by the existence of other concepts—e.g. (Concept 1: Tumor grade G1>>"low" TumorGrade value). Beyond the existence of other concepts as a whole, attributes can also be triggered based on metadata within a concept. For example, given a medication annotation that produces confidence scores for administered vs dispensed vs requested, one could have a MedicationAdministered attribute that's created anytime there's a medication annotation present in which the administered score is the highest and exceeds a designated threshold. The takeaway here is that attributes are configured to be output based on the presence of one or more other concepts detected via NLP and optionally matching criteria within the metadata fields of these other NLP concept annotations.

In some embodiments of the invention, the attribute identification module 122 folds the new attribute or concept into the existing attributes and concepts using machine learning algorithms such as collaborative filtering, matrix-factorization, and topic modeling. New attributes and concepts processed in this manner can be referred to as approximated attributes and concepts. For example, a new attribute can be approximated from existing (known) attributes using a factorization machine based on the concepts that are common between the new attribute and one or more existing attributes.

In some embodiments of the invention, an argument component detection (ACD) macro service 124 uses the approximated attribute definitions generated by the attribute identification module 112 to perform a concept search using the search engine 106. In some embodiments of the invention, the search engine 106 collects one or more resultant documents from the public corpus 116 based on the approximated attribute definitions.

In some embodiments of the invention, the resultant documents are passed to the ACD macro service 124 for annotation. In some embodiments of the invention, the ACD macro service 124 includes a Natural Language Understanding Module (not separately depicted) to annotate resultant documents. In some embodiments of the invention, the resultant document and the associated annotations are stored in a tenant-specific artifact storage (e.g., tenant corpus 126). In this manner, separation is provided from the publicly available corpus (e.g., public corpus 116).

In some embodiments of the invention, software application 110 is configured to generate a response 128 from the search engine 106. In some embodiments of the invention, the response 128 includes annotations, features, or facts regarding, for example, a patient associated with or otherwise described by a healthcare document within the public corpus 116. In some embodiments of the invention, software application 110 is configured to perform a corpora reconciliation process using the response 128 to generate corpora updates 130, resulting in corpora updates 130 stored temporarily in memory 118. The corpora updates 130 can include new and/or updated annotations based on the annotators 120 (including any tenant-specific annotations as described herein) that can be provided to the client 114 and/or incorporated within the annotations database 108.

In some embodiments of the invention, the updates 130 can be previewed by a user on a display screen (e.g., display 728 in FIG. 7) before applying any changes. After approval by the user using software application 110 and/or if preview is skipped, software application 110 can be configured to apply/commit the updates 130 to the tenant corpus 126 associated with the search query 112 and/or to the annotations database 108. If the user does not approve of the updates 130, the user can modify or delete the updates 130 using, for example, the software application 110 accessed via the client 114.

The techniques and systems discussed herein provide various technical benefits. According to one or more embodiments, tenant-specific annotator configurations can be identified to leverage subject matter expert (SME) annotator configuration knowledge to improve corpus annotation. As a direct result, search engine results of a public corpus can be improved. Moreover, the creation of tenant-specific corpora improves later search efficiency as the overall search space (i.e., the public corpus) can be reduced to the smaller tenant-specific corpus.

The embodiments described herein with respect to block diagram 100 of FIG. 1 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments. In addition, the various blocks in FIG. 1 can be configured in different manners than that shown in FIG. 1. For example, the attribute identification module 122 and the ACD macro service 124 can be implemented collectively as a single module and process.

Figure 2:
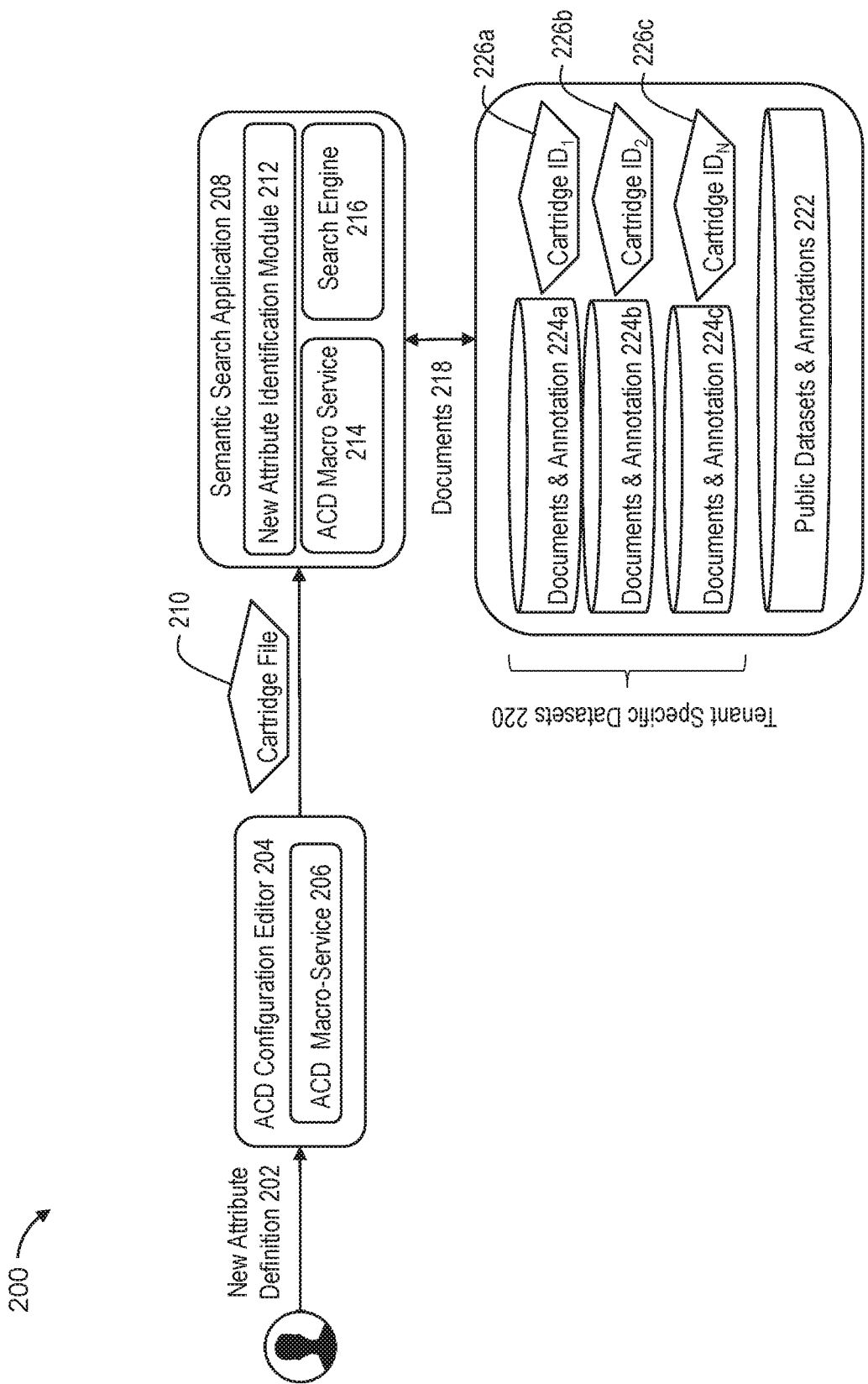
FIG. 2 depicts a block diagram of a system for generating tenant-specific datasets according to one or more embodiments of the present invention.

FIG. 2 depicts a block diagram 200 of a system for generating tenant-specific datasets in accordance with one or more embodiments of the present invention. In some embodiments of the invention, a new attribute definition 202 is provided to an ACD configuration editor 204. In some embodiments of the invention, the new attribute definition 202 is defined by a subject matter expert (SME) within the ACD configuration editor 204 at runtime (i.e., post deployment of the associated search engine). In some embodiments of the invention, the SME can use the ACD configuration editor 204 to define an arbitrary number of new attributes in this manner. In some embodiments of the invention, an attribute includes one or more concepts (sometimes referred to as concept definitions). In other words, an attribute can be made up of a combination of concepts.

In some embodiments of the invention, the ACD configuration editor 204 includes an ACD macro-service 206 configured to deploy the new attribute definition 202 to a semantic search application 208 through a cartridge file 210 (sometimes referred to as a cartridge zip file).

In some embodiments of the invention, the new attribute definition 202 deployed via the cartridge file 210 is not available in an index of the semantic search application 208 because the new attribute definition 202 is just being specified during the runtime operation. In some embodiments of the invention, the semantic search application 208 can accept the cartridge file 210 even when the new attribute definition 202 is not defined within the semantic search application 208 due to the presence of a new attribute identification module 212 and an embedded ACD macro-service 214.

In some embodiments of the invention, the attribute identification module 212 can inspect the cartridge file 210 to identify one or more new and existing attributes (including the new attribute definition 202). In some embodiments of the invention, the new attribute definition 202 is folded into existing attributes and concepts that are already within the index of the semantic search application 208 (this process is sometimes referred to herein as attribute approximation). The new attribute definition 202 can be approximated using a variety of techniques, such as, for example, collaborative filtering, matrix-factorization, and topic modeling.

In some embodiments of the invention, the semantic search application 208 includes a search engine 216. In some embodiments of the invention, the semantic search application 208 uses the approximated new attribute definition 202 to perform a concept search in the search engine 216. In some embodiments of the invention, the resultant documents 218 are passed to the embedded ACD macro-service 214 to obtain custom annotations (i.e., annotations that are unique to the new attribute definition 202).

In some embodiments of the invention, the resultant documents 218 and their annotations are kept in a tenant-specific dataset 220 (sometimes referred to as tenant-specific artifact storage) to maintain separation from a publicly available corpus (i.e., public datasets and annotations 222). In some embodiments of the invention, a separate tenant-specific dataset (i.e., documents and annotations 224a, 224b, 224c) is generated in this manner for each cartridge file 210 having user-defined attributes. In some embodiments of the invention, each of the tenant-specific datasets is associated with the respective cartridge file from which the tenant-specific dataset was generated. For example, the documents and annotations 224a, 224b, 224c can each be associated with the cartridge identifiers 226a, 226b, and 226c, respectively.

Figure 3:
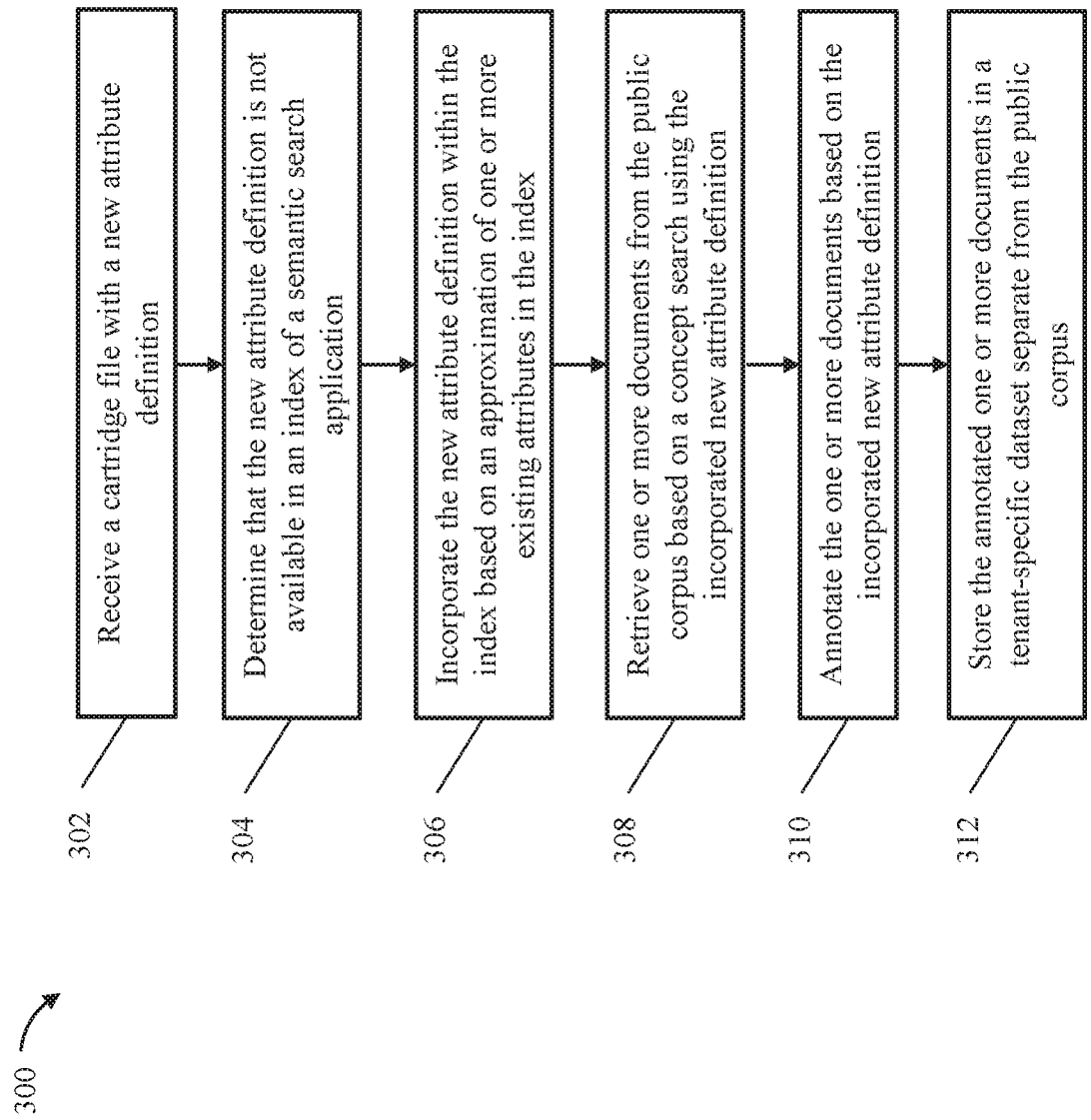
FIG. 3 depicts a flow diagram illustrating a method according to one or more embodiments of the invention.

FIG. 3 depicts a flow diagram 300 illustrating a method for customizing annotations for a search within a public corpus according to one or more embodiments of the invention. As shown at block 302, a cartridge file including a new attribute definition can be received by a semantic search application. In some embodiments of the invention, the semantic search application includes an embedded argument component detection (ACD) macro-service, an attribute identification module, and a search engine. In some embodiments of the invention, the new attribute definition is defined by a subject matter expert using an ACD configuration editor.

At block 304, the semantic search application determines that the new attribute definition is not available in an index of the semantic search application. In some embodiments of the invention, the new attribute definition includes one or more concepts that are available within the index.

At block 306, the new attribute definition is incorporated within the index based on an approximation of one or more existing attributes in the index. In some embodiments of the invention, the attribute identification module makes the approximation using at least one of collaborative filtering, matrix-factorization, and topic modeling.

At block 308, one or more documents are retrieved from the public corpus based on a concept search using the incorporated new attribute definition. At block 310, the one or more documents are annotated based on the incorporated new attribute definition. At block 312, the annotated one or more documents are stored in a tenant-specific dataset separate from the public corpus.

The method can further include receiving a search query in the semantic search application and determining a search result of the tenant-specific dataset based on the search query and the annotated one or more documents. In some embodiments of the invention, a search engine of the semantic search application is customized during runtime. In some embodiments of the invention, customizing the search engine includes customizing a keyword based on a concept in the new attribute definition.

Figure 4:
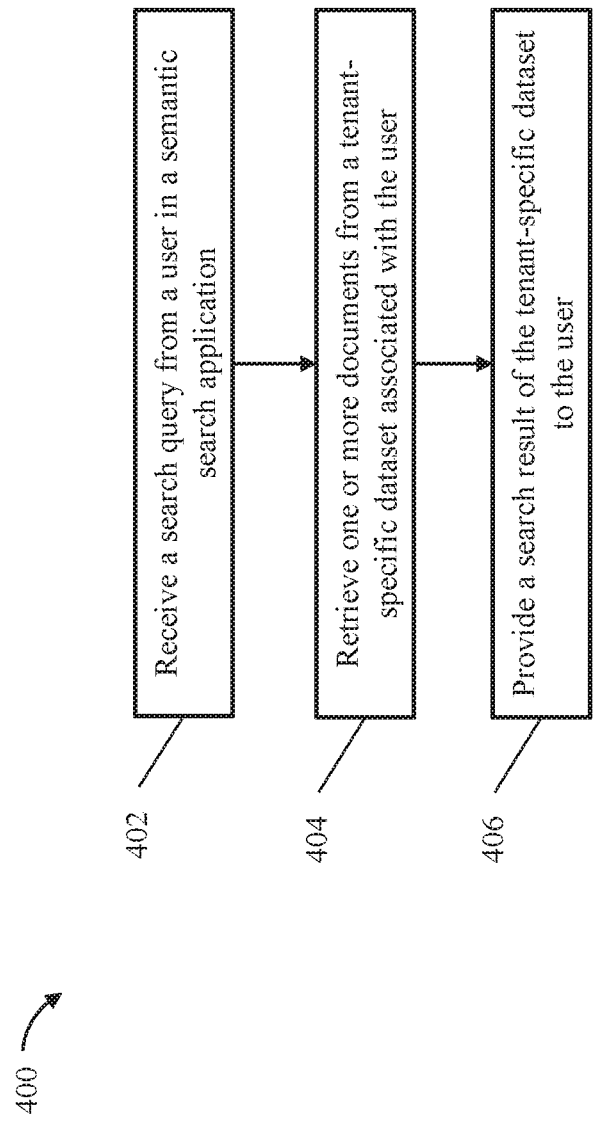
FIG. 4 depicts a flow diagram illustrating a method according to one or more embodiments of the invention.

FIG. 4 depicts a flow diagram 400 illustrating a method according to one or more embodiments of the invention. As shown at block 402, a search query is received from a user in a semantic search application. At block 404, one or more documents are retrieved from a tenant-specific dataset associated with the user.

In some embodiments of the invention, the tenant-specific dataset is generated at runtime from a public corpus based on an attribute definition in a cartridge file. In some embodiments of the invention, the attribute definition is used to generate custom annotations of one or more documents in the tenant-specific dataset. In some embodiments of the invention, the tenant-specific dataset is stored separately from the public corpus. At block 406, a search result of the tenant-specific dataset is provided to the user.

The process flow diagrams of FIGS. 3 and 4 are not intended to indicate that the operations of the methods 300 and 400 are to be executed in any particular order, or that all of the operations of the methods 300 and 400 are to be included in every case. Additionally, the methods 300 and 400 can include any suitable number of additional operations.

The processing methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
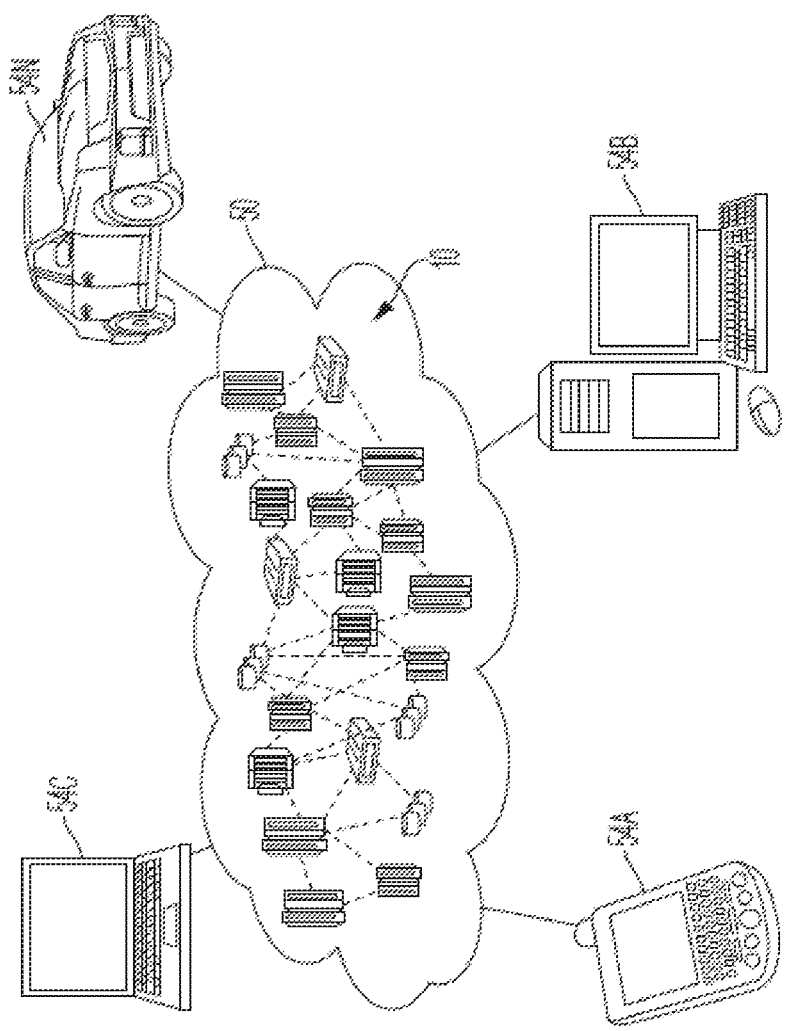
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
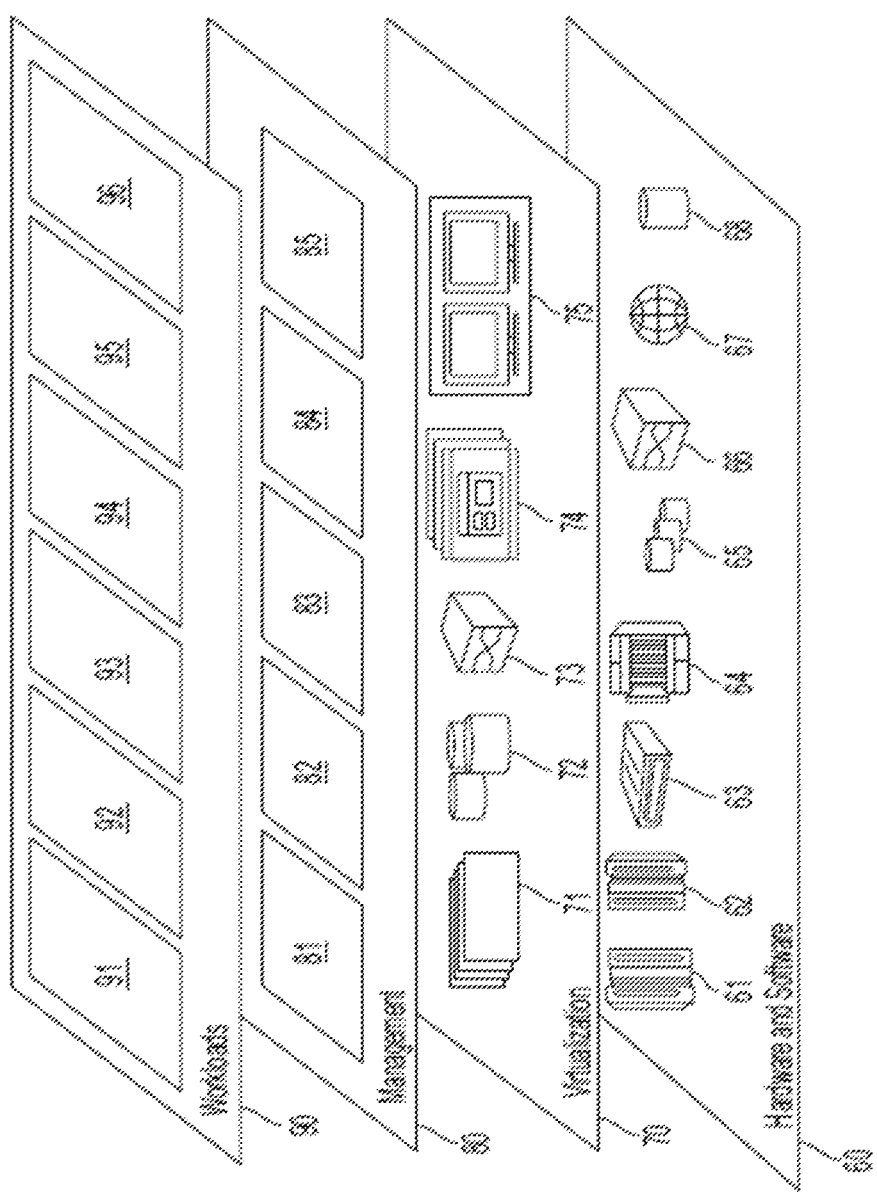
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 110 in FIG. 1) implemented in workloads and functions 96. Also, software applications can function with and/or be integrated with Resource provisioning 81.

Figure 7:
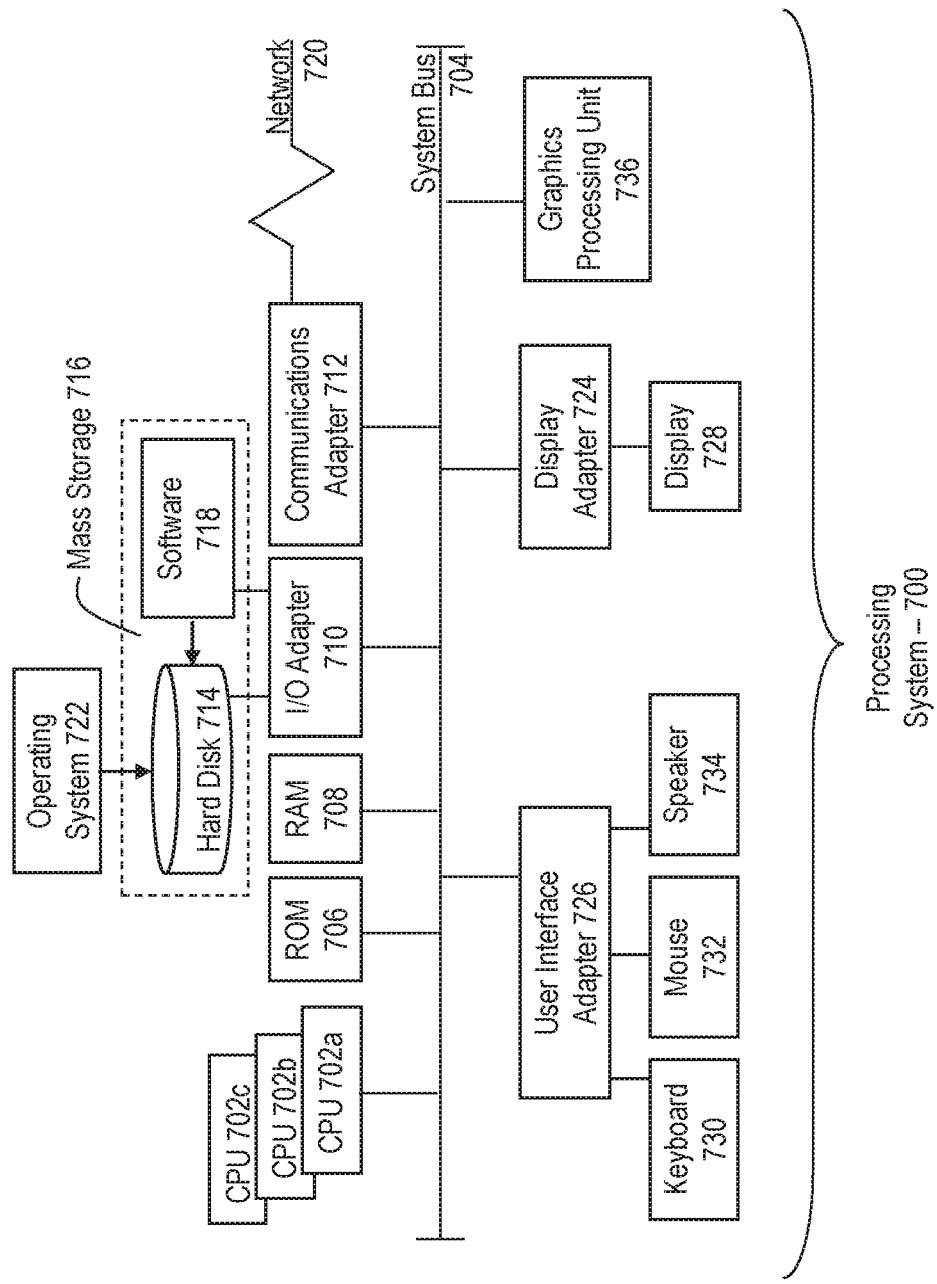
FIG. 7 is a block diagram of an example computer system for use in conjunction with one or more embodiments of the present invention.

Turning now to FIG. 7, a computer processing system 700 is generally shown in accordance with one or more embodiments of the invention. The processing system 700 can be an electronic, computer framework comprising and/or employing any number and combination of computing devices and networks utilizing various communication technologies, as described herein. The processing system 700 can be easily scalable, extensible, and modular, with the ability to change to different services or reconfigure some features independently of others. The processing system 700 may be, for example, a server, desktop computer, laptop computer, tablet computer, or smartphone. In some examples, processing system 700 may be a cloud computing node. Processing system 700 may be described in the general context of computer system executable instructions, such as program modules, being executed by a computer system. Generally, program modules may include routines, programs, objects, components, logic, data structures, and so on that perform particular tasks or implement particular abstract data types. Processing system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the processing system 700 has one or more central processing units (CPU(s)) 702a, 702b, 702c, etc., (collectively or generically referred to as processor(s) 702). The processors 702 can be a single-core processor, multi-core processor, computing cluster, or any number of other configurations. The processors 702, also referred to as processing circuits, are coupled via a system bus 704 to a read only memory (ROM) 706 and a random access memory (RAM) 708 (collectively, the system memory). The ROM 706 is coupled to the system bus 704 and may include a basic input/output system (BIOS) or its successors like Unified Extensible Firmware Interface (UEFI), which controls certain basic functions of the processing system 700. The RAM 708 is read-write memory coupled to the system bus 704 for use by the processors 702. The system memory provides temporary memory space for operations of said instructions during operation. The system memory can include RAM, read only memory, flash memory, or any other suitable memory systems.

The processing system 700 comprises an input/output (I/O) adapter 710 and a communications adapter 712 coupled to the system bus 704. The I/O adapter 710 may be a small computer system interface (SCSI) adapter that communicates with a hard disk 714 and/or any other similar component. The I/O adapter 710 and the hard disk 714 are collectively referred to herein as a mass storage 716.

Software 718 for execution on the processing system 700 may be stored in the mass storage 716. The mass storage 716 is an example of a tangible storage medium readable by the processors 702, where the software 718 is stored as instructions for execution by the processors 702 to cause the processing system 700 to operate, such as is described herein below with respect to the various Figures. Examples of computer program product and the execution of such instruction is discussed herein in more detail. The communications adapter 712 interconnects the system bus 704 with a network 720, which may be an outside network, enabling the processing system 700 to communicate with other such systems. In one embodiment, a portion of the system memory and the mass storage 716 collectively store an operating system 722, which may be any appropriate operating system to coordinate the functions of the various components shown in FIG. 7.

Additional input/output devices are shown as connected to the system bus 704 via a display adapter 724 and a user interface adapter 726. In one embodiment, the adapters 710, 712, 724, and 726 may be connected to one or more I/O buses that are connected to the system bus 704 via an intermediate bus bridge (not shown). A display 728 (e.g., a screen or a display monitor) is connected to the system bus 704 by the display adapter 724, which may include a graphics processing unit 736 (graphics controller) to improve the performance of graphics intensive applications and a video controller. A keyboard 730, a mouse 732, a speaker 734, etc., can be interconnected to the system bus 704 via the interface adapter 726, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 7, the processing system 700 includes processing capability in the form of the processors 702, and, storage capability including the system memory and the mass storage 716, input means such as the keyboard 730 and the mouse 732, and output capability including the speaker 734 and the display 728.

In some embodiments, the communications adapter 712 can transmit data using any suitable interface or protocol, such as the internet small computer system interface, among others. The network 720 may be a cellular network, a radio network, a wide area network (WAN), a local area network (LAN), or the Internet, among others. An external computing device may connect to the processing system 700 through the network 720. In some examples, an external computing device may be an external webserver or a cloud computing node.

It is to be understood that the block diagram of FIG. 7 is not intended to indicate that the processing system 700 is to include all of the components shown in FIG. 7. Rather, the processing system 700 can include any appropriate fewer or additional components not illustrated in FIG. 7 (e.g., additional memory components, embedded controllers, modules, additional network interfaces, etc.). Further, the embodiments described herein with respect to processing system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Any of the components shown in FIG. 7 may be coupled to each other via a network. The network(s) may be implemented by any network(s) known in the art such as, but not limited to a local area network (LAN), a direct cable connection, a cloud computing environment such as that shown below in FIG. 5, and/or the Internet.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments described herein whether or not explicitly stated.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for customizing annotations for a search within a public corpus, the computer-implemented method comprising:
   receiving, by a semantic search application, a cartridge file comprising a new attribute definition, the new attribute definition specified for a first time at runtime;
   determining that the new attribute definition is not available in an index of the semantic search application;
   incorporating the new attribute definition within the index based on an approximation of one or more existing attributes in the index, wherein the approximation is made using at least one of collaborative filtering, matrix-factorization, and topic modeling;
   retrieving one or more documents from the public corpus based on a concept search using the incorporated new attribute definition;
   annotating the one or more documents based on the incorporated new attribute definition; and
   storing the annotated one or more documents in a tenant-specific dataset separate from the public corpus.

2. The method of claim 1 further comprising receiving, by the semantic search application, a search query.

3. The method of claim 2 further comprising determining a search result of the tenant-specific dataset based on the search query and the annotated one or more documents.

4. The method of claim 1, wherein the new attribute definition comprises one or more concepts that are available within the index.

5. The method of claim 1, wherein the new attribute definition is defined by a subject matter expert using an argument component detection (ACD) configuration editor.

6. The method of claim 1 further comprising customizing a search engine of the semantic search application during runtime.

7. The method of claim 6, wherein customizing the search engine comprises customizing a keyword based on a concept in the new attribute definition.

8. A system comprising one or more processors for executing computer readable instructions, the computer readable instructions controlling the one or more processors to perform operations comprising:
   receiving, by a semantic search application, a cartridge file comprising a new attribute definition, the new attribute definition specified for a first time at runtime;
   determining that the new attribute definition is not available in an index of the semantic search application;
   incorporating the new attribute definition within the index based on an approximation of one or more existing attributes in the index, wherein the approximation is made using at least one of collaborative filtering, matrix-factorization, and topic modeling;
   retrieving one or more documents from the public corpus based on a concept search using the incorporated new attribute definition;
   annotating the one or more documents based on the incorporated new attribute definition; and
   storing the annotated one or more documents in a tenant-specific dataset separate from the public corpus.

9. The system of claim 8 further comprising receiving, by the semantic search application, a search query.

10. The system of claim 9 further comprising determining a search result of the tenant-specific dataset based on the search query and the annotated one or more documents.

11. The system of claim 8, wherein the new attribute definition comprises one or more concepts that are available within the index.

12. The system of claim 8, wherein the new attribute definition is defined by a subject matter expert using an argument component detection (ACD) configuration editor.

13. The system of claim 8 further comprising customizing a search engine of the semantic search application during runtime.

14. The system of claim 13, wherein customizing the search engine comprises customizing a keyword based on a concept in the new attribute definition.

15. A computer program product comprising a computer readable storage medium having program instructions embodied therewith, the program instructions executable by one or more processors to cause the one or more processors to perform operations comprising:
   receiving, by a semantic search application, a cartridge file comprising a new attribute definition, the new attribute definition specified for a first time at runtime;
   determining that the new attribute definition is not available in an index of the semantic search application;
   incorporating the new attribute definition within the index based on an approximation of one or more existing attributes in the index, wherein the approximation is made using at least one of collaborative filtering, matrix-factorization, and topic modeling;
   retrieving one or more documents from the public corpus based on a concept search using the incorporated new attribute definition;
   annotating the one or more documents based on the incorporated new attribute definition; and
   storing the annotated one or more documents in a tenant-specific dataset separate from the public corpus.

16. The computer program product of claim 15 further comprising receiving, by the semantic search application, a search query.

17. The computer program product of claim 16 further comprising determining a search result of the tenant-specific dataset based on the search query and the annotated one or more documents.

18. The computer program product of claim 15, wherein the new attribute definition comprises one or more concepts that are available within the index.

* * * * *